United States Patent
Budovec et al.

[11] Patent Number: 6,062,573
[45] Date of Patent: May 16, 2000

[54] GASKET SEAL HAVING AN IMPROVED ATTACHMENT ELEMENT

[75] Inventors: Ronald T. Budovec, Oak Brook; Daniel C. Battistoni, West Chicago; James Mikos, Westchester, all of Ill.

[73] Assignee: Dana Corporation, Toledo, Ohio

[21] Appl. No.: 09/082,328

[22] Filed: May 21, 1998

[51] Int. Cl.[7] .................................................. F02F 11/00
[52] U.S. Cl. ........................................................ 277/598
[58] Field of Search .................................. 277/591, 594, 277/596, 598, 630

[56] References Cited

U.S. PATENT DOCUMENTS

| | | |
|---|---|---|
| 3,108,818 | 10/1963 | Fursstenburg . |
| 3,874,675 | 4/1974 | Belter et al. . |
| 4,535,999 | 8/1985 | Locacius . |
| 4,783,087 | 11/1988 | DeCore et al. . |
| 4,976,225 | 12/1990 | Stang et al. . |
| 5,039,117 | 8/1991 | Gohrlich et al. . |
| 5,145,190 | 9/1992 | Boardman . |
| 5,348,311 | 9/1994 | Miyaoh et al. . |
| 5,671,927 | 9/1997 | Schweiger . |

*Primary Examiner*—Anthony Knight
*Assistant Examiner*—Robert L. Pilaud
*Attorney, Agent, or Firm*—Rader, Fishman & Grauer PLLC

[57] ABSTRACT

A gasket assembly includes a gasket body and a separate gasket seal. The gasket body includes first and second opposing faces, at least one seal opening therein and a plurality of attachment openings. The gasket seal includes a plate having a body portion defined by and outer periphery of the plate, with at least one fluid flow opening therein and a plurality of attachment elements integral with the outer periphery of the plate. Each attachment element extends radially outwardly from the outer periphery of the plate and includes a trunk and transversely extending wings that terminate in tips. The gasket seal is received within the seal opening of the gasket body with the trunk of each attachment element in abutting relation with the first opposing face of the gasket body. The wings extend through the attachment opening and the tips are then bent into facing relation with the second opposing face, thereby securing the gasket seal within the gasket body.

24 Claims, 2 Drawing Sheets

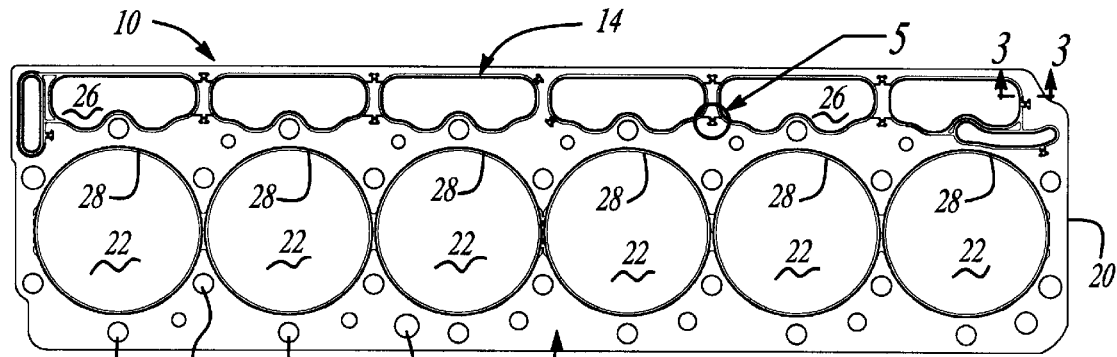
Fig-1
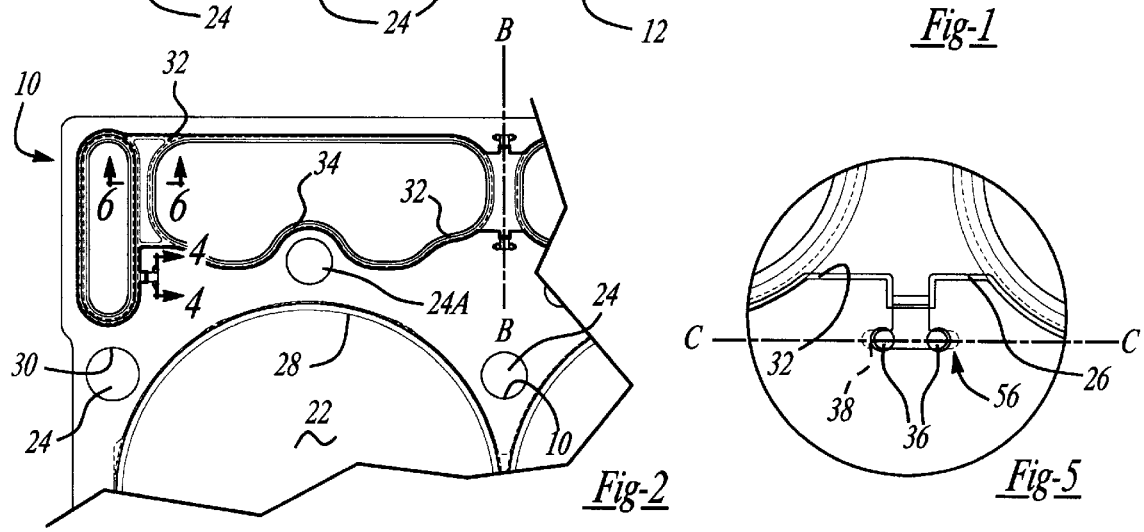
Fig-2
Fig-5
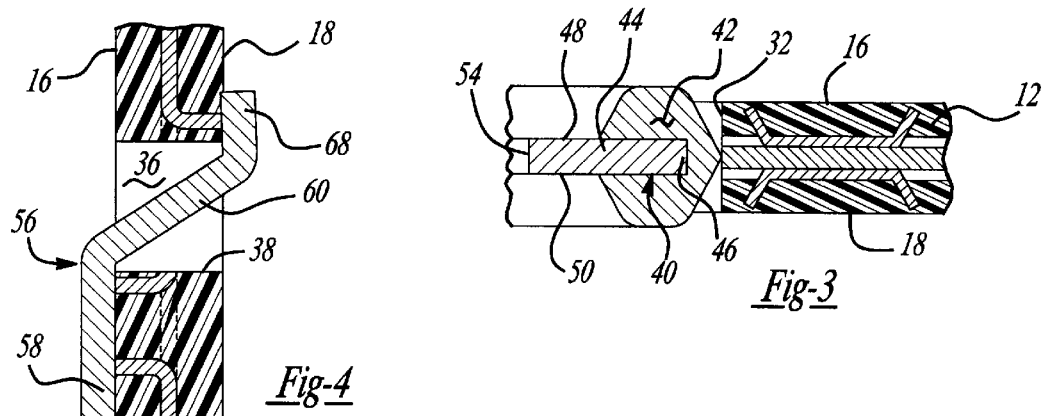
Fig-3
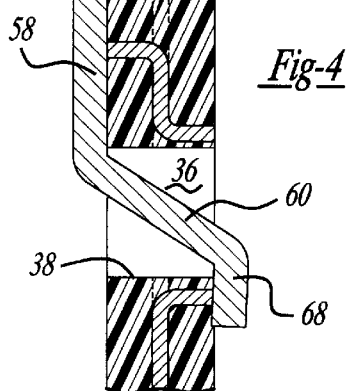
Fig-4
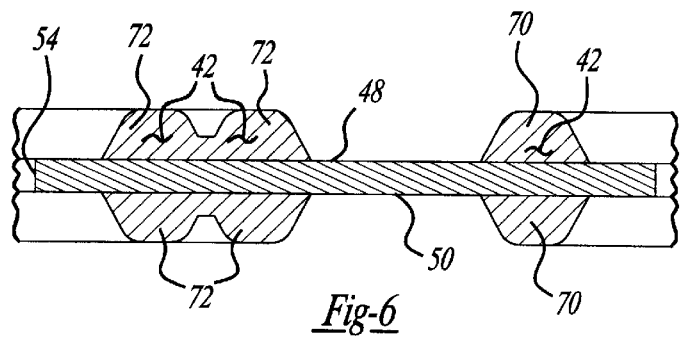
Fig-6

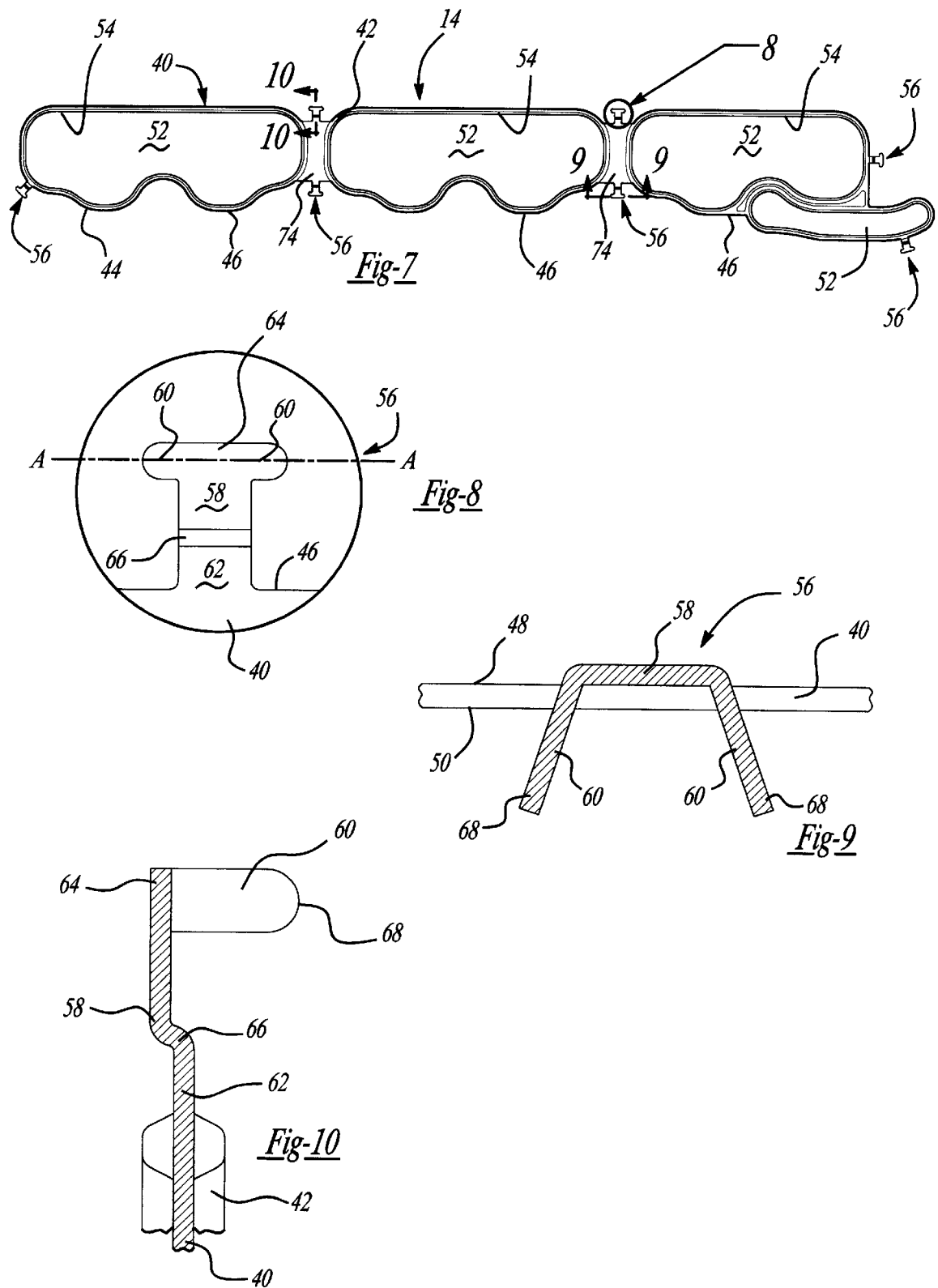

GASKET SEAL HAVING AN IMPROVED ATTACHMENT ELEMENT

FIELD OF THE INVENTION

The present invention relates generally to improvements in gasket assemblies. More particularly, the present invention relates to a separate gasket seal for fluid openings, the seal having an integral attachment element that cooperates with a gasket body to retain the seal with the gasket body.

BACKGROUND OF THE INVENTION

Gaskets are often used to seal mating mechanical components between the engine block and cylinder head of an internal combustion engine. Such gaskets typically extend around cylinder bores and simultaneously seal fluid flow openings, such as coolant and oil openings, to prevent undesirable mixing of the fluids or leakage. However, because fluids passing though the gasket openings in a combustion engine are often subject to fluid motion and elevated temperatures, additional separate sealing members are generally required to adequately seal the fluid openings.

One known manner in which separate sealing members are secured to the gasket body is through application of an adhesive between the sealing member and the gasket body. However, use of adhesive is disadvantageous. In particular, the gasket body and sealing member have a limited area of contact available in which to apply the adhesive. Further, bonded seals often disengage from the gasket body during handling or operation.

To overcome such disadvantages, other known sealing members are provided with separate mechanical fasteners to secure the seal to the gasket body. The fasteners are secured between the sealing member and the gasket body adjacent the opening to be sealed However, the fastener must be secured to the gasket body by a portion of the clamping force from a bolted connection of the mating mechanical components, thereby reducing the amount of clamping force required to adequately compress the seal. Thus, high load areas occur, resulting in fluid leakage, which may cause damage to the gasket or the mating mechanical components. Further, the use of separate mechanical fasteners also serve to increase inventory control costs as well as manufacturing costs.

Other known sealing members include integral tabs or projections for securing the seal to the gasket body. The tabs are compressed into the surface of the gasket body so as to be flush with the surface of the gasket body and engage an aperture within the gasket body. However, the tab may accidentally become dislodged from the aperture and reduce the seal integrity. Further, compression of the tabs into the gasket body results in undesirable localized stress loading at the points of contact of tabs. Over time, the stress loading results reduced sealing effectiveness, thereby causing leaks.

SUMMARY OF THE INVENTION

The present invention is directed to a gasket assembly having a gasket body and a separate gasket seal with an improved attachment element.

The gasket body has first and second opposing faces, an outer periphery and a plurality of openings defined by inner peripheries. In particular, the gasket body includes seal openings and attachment openings, wherein the attachment openings are arranged in pairs. The gasket seal is receivable within the seal opening.

The gasket seal includes a plate and at least one bead of deformable material. The plate has a body portion defined by an outer periphery. The body portion further includes at least one fluid flow opening defined by an inner periphery. In a preferred embodiment, the body portion includes a plurality of fluid flow openings connected together by a web-like section of the body portion. The deformable material extends around the periphery of each fluid flow opening to act as a sealing member. A plurality of integral attachment elements extend outwardly radially from the outer periphery of the plate.

Each attachment element includes a trunk and transversely extending wings. The trunk has a base that is integral with the outer periphery of the plate and a distal end that is spaced radially outwardly from the base. By having the base integral with the outer periphery, accidental dislodgment of the attachment element is eliminated. The trunk further includes an offset portion that results in a generally S-shaped cross-section for the trunk.

The wings are integral with and extend transversely from the distal end of the trunk and are arranged in an opposing manner so as to be positioned in alignment along a common axis. The wings are downwardly angled relative to the trunk and terminate in tips such that the tips are positioned a predetermined distance from the trunk.

To secure the gasket seal to the gasket body, the gasket seal is inserted into the seal opening of the gasket body with the deformable material preferably being positioned adjacent to the inner periphery of the seal opening. The trunks of the attachment elements are in facing relation with the first opposing face of the gasket body and the wings are extended through the attachment openings. The tips are bent upward and into facing relation with the second opposing face of the gasket body, thereby positively securing the gasket seal within the seal opening without additional mechanical fasteners. Further, a portion of the clamping force applied to the gasket assembly is not required to secure the sealing member to the gasket body, thereby insuring a satisfactory seal around the fluid opening.

The wings and the attachment openings cooperate to properly locate the gasket seal in the correct orientation within the seal opening of the gasket body. Further, the wings and attachment openings positively secure the gasket seal to the gasket body such that the attachment elements need not be compressed into the gasket body. The trunk and the wings provide additional surface area to evenly distribute the stress loads of the gasket seal. Thus, excessive stress loading at the points of contact of the wings is avoided and seal life of the gasket assembly is prolonged. Additionally, the arrangement of the dual winged attachment element and pair of attachment openings provides a more positive seal as opposed to other gasket seals, because both wings must come dislodged from separate attachment openings for the gasket seal to become disengaged from the gasket body.

BRIEF DESCRIPTION OF THE DRAWINGS

The features and inventive aspects of the present invention will become more apparent upon reading the following detailed description, claims, and drawings, of which the following is a brief description:

FIG. 1 a planar view of a gasket assembly in accordance with the present invention, including a gasket body and a gasket seal.

FIG. 2 is an enlarged portion of the gasket assembly of FIG. 1.

FIG. 3 is a cross-sectional view of the gasket assembly taken along line 3—3 in FIG. 1.

FIG. 4 is a cross-sectional view of the integral attachment element taken along line 4—4 in FIG. 2.

FIG. 5 is an enlarged planar view of the integral attachment element shown by encircled region 5 in FIG. 1.

FIG. 6 is a cross-sectional view of a gasket seal taken along line 6—6 in FIG. 2.

FIG. 7 is a planar view of a gasket seal for use in a gasket assembly in accordance with the present invention before the seal is installed.

FIG. 8 is an enlarged planar view of an integral attachment element of the gasket seal shown by encircled region 8 of FIG. 7.

FIG. 9 is a cross-sectional view of the integral attachment element of the gasket seal taken along line 9—9 of FIG. 7.

FIG. 10 is a cross-sectional view of the integral attachment element of the gasket seal taken along line 10—10 of FIG. 7.

DETAILED DESCRIPTION OF PREFERRED EMBODIMENTS

FIGS. 1 and 2 show a gasket assembly 10 that is used to seal mating mechanical components (not shown) such as an engine block and cylinder head of an internal combustion engine. Gasket assembly 10 includes a gasket body 12 and at least one separate gasket seal 14.

Gasket body 12 includes opposing faces 16 and 18, as best seen in FIGS. 3 and 4, and an outer periphery 20. Disposed within gasket body 12 are a plurality of openings, combustion bore openings 22, bolt hole openings 24 and seal openings 26. Each opening 22, 24, and 26 is defined by respective inner peripheries, combustion bore openings 22 having an inner periphery 28, bolt hole openings 24 having an inner periphery 30 and seal openings 26 having an inner periphery 32. In a preferred embodiment, inner periphery 32 has a plurality of semi-circular portions 34 to accommodate adjacent bolt hole openings 24a. Gasket body 12 further includes attachment openings 36, as best seen in FIGS. 4 and 5, defined by an inner periphery 38. Attachment openings 36 will be discussed further in greater detail below.

Each gasket seal 14, is receivable within a seal opening 26, as best shown in FIG. 1. As shown in FIG. 7, gasket seal 14 includes a plate 40 and a deformable material 42. Plate 40 is preferably constructed of SAE 1010 steel so as to be durable and wear-resistant Deformable material 42 is preferably constructed from an elastomeric material, including silicone, flurosilicone, viton, or nitrile so that material 42 may be readily deformed.

Plate 40 includes a body portion 44 defined by an outer periphery 46, and opposing first and second surfaces 48 and 50, respectively, as best seen in FIG. 6. Outer periphery 46 has a shape that substantially corresponds to the shape of inner periphery 32 of seal openings 26. Body portion 44 further defines at least one fluid flow opening 52 having an inner periphery 54.

A plurality of attachment elements 56 extend radially outwardly from outer periphery 46 of plate 40. Each attachment element 56, as best shown in FIG. 8, includes a radially extending trunk 58 and transversely extending wings 60. Trunk 58 has a base 62 and a distal end 64. Base 62 is integral with outer periphery 46 of plate 40 preventing accidental dislodgment of an attachment element 56 from plate 40. Trunk 58 further has an offset portion 66, that defines a generally S-shaped cross-section, as best shown in FIG. 9. Offset portion 66 serves to offset distal end 64 from base 62 such that distal end 64 is spaced upward relative to the base 62.

Wings 60 are integral with and extend transversely from distal end 64 of trunk 58 and are opposing so as to be positioned in alignment along axis A—A, as shown in FIG. 8. However, it is understood that wings 60 may optionally be positioned to be offset from one another. Wings 60 terminate in radially outer arched tips 68. Further, wings 60 are downwardly angled relative to trunk 58 such that tips 68 are positioned a predetermined distance from trunk 58.

Deformable material 42 is secured to outer periphery 46 of plate 40, as shown in FIG. 3. Preferably, deformable material 42 is molded directly to first and second opposing surfaces 48 and 50 of body portion 44 of plate 40 along outer periphery 46 so as to ensure an adequate seal around sealing opening 26. Deformable material 42 is preferably molded into a raised bead 70 that compensates for the limited available surface area around outer periphery 46 of plate 40 without reducing sealing capabilities. When gasket seal 14 is positioned within gasket body 12, to be discussed further in greater detail below, bead 70 extends axially beyond the respective opposing faces 16 and 18 of gasket body 12, as shown in FIG. 3. Thus, when gasket assembly 10 is compressed between mating mechanical components, the thicker deformable bead 70 provides an improved seal for fluid flow opening 52. A double bead 72, as shown in FIG. 6, may be provided for an increased sealing capability.

In a preferred embodiment, body portion 44 includes a plurality of fluid flow openings 52, as shown in FIG. 7. Each fluid flow opening 52 is connected together by a web-like section 74 of body portion 44. Bead 70 is disposed around the periphery of each fluid flow opening 52 such that bead 70 is spaced radially outwardly from inner periphery 54, as shown in FIG. 7. Each web-like section 74 includes at least one integral attachment element 56 extending radially outwardly. Preferably, there are two attachment elements 56 on each web-like section 74, wherein the attachment elements 56 are arranged in an opposing manner along a common axis B—B, as best seen in FIG. 2, and each of the outermost fluid flow openings 52 have at least one attachment element 56 extending radially outwardly from outer periphery 46, to insure that gasket seal 14 is adequately retained within seal openings 26 of gasket body 12.

Referring to FIGS. 1–5, to connect gasket seal 14 to gasket body 12, gasket seals 14 are placed within seal openings 26 such that attachment elements 56 are positioned adjacent to attachment openings 36. Due to offset portion 66, each trunk 58 comes into abutting contact with first opposing face 16 of gasket body 12, as seen in FIG. 4. Wings 60 are then extended through attachment openings 36. Openings 36 must have a significantly large radius to accommodate offset portion 66 and tips 68. Attachment openings 36 are positioned adjacent to seal opening 26 in pairs, wherein the pairs are positioned in alignment along a common axis C—C. Tips 68 are bent upward into abutting contact with second opposing face 18 of gasket body 12, thereby firmly securing gasket seal 14 within a seal opening 26.

By having wings 60 engage second opposing face 18 to hold gasket seal 14 in place, a portion of the clamping force is not required to secure gasket seal 14 to gasket body 12.

Thus, full clamping force is available to insure a leak proof seal. Further, attachment of gasket seal 14 within gasket body 12 is aided by the having wings 60 extend through attachment openings 36 and positively attach to gasket body 12, without requiring attachment elements 56 to be compressed within gasket body 12. Thus, excessive stress loading is also avoided, thereby prolonging the durability of gasket assembly 10. Press fitting and the use of adhesive are also eliminated, reducing tool wear, alignment difficulties and accidental dislodgment of gasket seal 14 from gasket body 12 during handling.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A gasket seal for use in a gasket assembly, comprising:
   a plate having a body portion defined by an outer periphery, wherein said body portion defines at least one fluid flow opening therein, and further includes a plurality of attachment elements extending radially outwardly from said outer periphery, each of said attachment elements including a radially extending trunk and transversely extending wings, wherein each of said wings are receivable in a separate attachment opening formed in a gasket body without piercing the gasket body to thus secure said gasket seal to seal openings in the gasket body, and
   a deformable material connected to said outer periphery of said body portion of said plate to provide for additional sealing capabilities for said casket seal.

2. A gasket seal as in claim 1, wherein each of said wings terminate in a tip, said wings being downwardly angled relative to said trunk such that said tips are positioned a predetermined distance from said trunk.

3. A gasket seal as in claim 1, wherein said trunk has a base and a distal end, said base being integral with said outer periphery of said plate.

4. A gasket seal as in claim 3, wherein said wings are positioned at said distal end of said trunk.

5. A gasket seal as in claim 4, wherein said wings are arranged in an opposing manner so as to be positioned in alignment along a common axis.

6. A gasket seal as in claim 3, wherein each of said trunks has an offset portion resulting in a generally S-shaped cross-section such that said distal end is offset from said base.

7. A gasket seal as in claim 1, wherein the attachment openings of the gasket body are are spaced away from the fluid openings of the gasket body.

8. A gasket seal for use in a gasket assembly, comprising:
   a plate having a body portion defined by an outer periphery, wherein said body portion defines at least one fluid flow opening, spaced radially inwardly from said outer periphery, and further includes a plurality of integral attachment elements extending radially outwardly from said outer periphery;
      each of said attachment elements including a radially extending trunk and transversely extending wings, said trunk having a base portion and a distal end, wherein said base portion is integral with said outer periphery, said wings being opposing and positioned at said distal end of said trunk, wherein each of said wings terminate in tips, each of said wings being downwardly angled with respect to said trunk such that said tips are positioned a predetermined distance with respect to said trunk, each of said wings being receivable within a separate attachment opening formed in a gasket body without piercing the gasket body to thus secure said gasket seal to a seal opening in the gasket body; and
   a deformable material bonded to said outer periphery of said body portion of said plate to provide for additional sealing capabilities for said gasket seal.

9. A gasket seal as in claim 8, wherein said trunk has an offset portion resulting in a generally S-shaped cross-section such that said distal end is offset upwardly from said base.

10. A gasket seal as in claim 8, wherein said body portion has a plurality of fluid flow openings therein, each of said fluid flow openings having an inner periphery, wherein a bead of said deformable material is connected to said body portion adjacent to, but spaced radially outwardly from said inner periphery of said fluid flow openings.

11. A gasket seal as in claim 9, wherein a web-like section of said body portion extends between said fluid openings, at least one of said integral attachment elements extending radially outwardly from said outer periphery of said web-like section.

12. A gasket seal as in claim 11, wherein at least two of said integral attachment elements extend radially outwardly from said outer periphery of said web-like section of said body portion, said attachment elements being positioned so as to be opposing, along a common axis with said web-like section therebetween.

13. A gasket assembly adapted to seal a fluid flow opening, comprising:
   a gasket body with first and second opposing faces and having at least one seal opening therein and a plurality of attachment openings located adjacent to said seal opening; and
   a gasket seal received within said seal opening of said gasket body, said gasket seal including:
   a plate having a body portion defined by an outer periphery, wherein said body portion defines at least one fluid flow opening therein, and further including a plurality of integral attachment elements extending radially outwardly from said outer periphery, each of said attachment elements including a radially extending trunk having transversely extending wings, each of said wings terminating in tips, said wings being downwardly angled relative to said trunk such that said tips are positioned a predetermined distance from said trunk, wherein said trunk is in facing relation with said first opposing surface of said gasket body, said wings extending through said attachment openings of said gasket body with said tips being bent against said second opposing surface of said gasket body in facing relation without piercing the gasket body, thereby securing said gasket seal to a seal opening in said gasket body, and
   a deformable material connected to said outer periphery of said body portion of said plate to provide for additional sealing capabilities for said gasket seal.

14. A gasket assembly as in claim 13, wherein said trunk has a base and a distal end, said base being integral with said body portion of said plate.

15. A gasket assembly as in claim 14, wherein said wings are arranged in an opposing manner so as to be positioned in alignment along a common axis.

16. A gasket assembly as in claim 15, wherein said wings are positioned at said distal end of said trunk.

17. A gasket assembly as in claim 15, wherein said attachment openings are positioned adjacent said seal opening in pairs, each of said pairs being positioned in alignment along a common axis.

18. A gasket assembly as in claim 15, wherein each of said trunks has an offset portion that results in a generally S-shaped cross-section such that said distal end is offset from said base.

19. A gasket assembly as in claim 15, wherein said body portion has a plurality of fluid flow openings therein, each of said fluid flow openings having an outer periphery, wherein a bead of said deformable material is bonded to said body portion adjacent to, but radially outwardly from an inner periphery of said fluid openings.

20. A gasket assembly as in claim 19, wherein a web-like section of said body portion extends between said fluid flow openings, at least one of said integral attachment elements extending radially outwardly from said outer periphery of said web-like section.

21. A gasket assembly as in claim 20, wherein at least two of said integral attachment elements extend radially outward from said outer periphery of said web-like section of said body portion, said attachment elements being positioned so as to be opposing, along a common axis with said web-like section therebetween.

22. A gasket seal for use in a gasket assembly, comprising:

a plate having a body portion defined by an outer periphery, wherein said body portion defines at least one fluid flow opening therein, and further includes a plurality of attachment elements extending radially outwardly from said outer periphery, each of said attachment elements including a radially extending trunk and transversely extending wings;

wherein said trunk has a base and a distal end, said base being integral with said outer periphery of said plate and each of said trunks has an offset portion resulting in a generally S-shaped cross-section such that said distal end is offset from said base;

wherein each of said wings are receivable in an attachment opening formed in a gasket body without piercing the gasket body to thus secure said gasket seal to a seal opening in the gasket body; and a deformable material connected to said outer periphery of said body portion of said plate to provide for additional sealing capabilities for said gasket seal.

23. A gasket seal as in claim 22, wherein said wings are arranged in an opposing manner so as to be positioned in alignment along a common axis.

24. A gasket seal as in claim 23, wherein said wings terminate in tips, said wings being downwardly angled relative to said trunk such that said tips are positioned a predetermined distance from said trunk.

* * * * *